Oct. 2, 1923.
W. N. CLARK
AUTOMOBILE EXTRACTOR
Filed Jan. 14, 1922
1,469,249
2 Sheets-Sheet 2
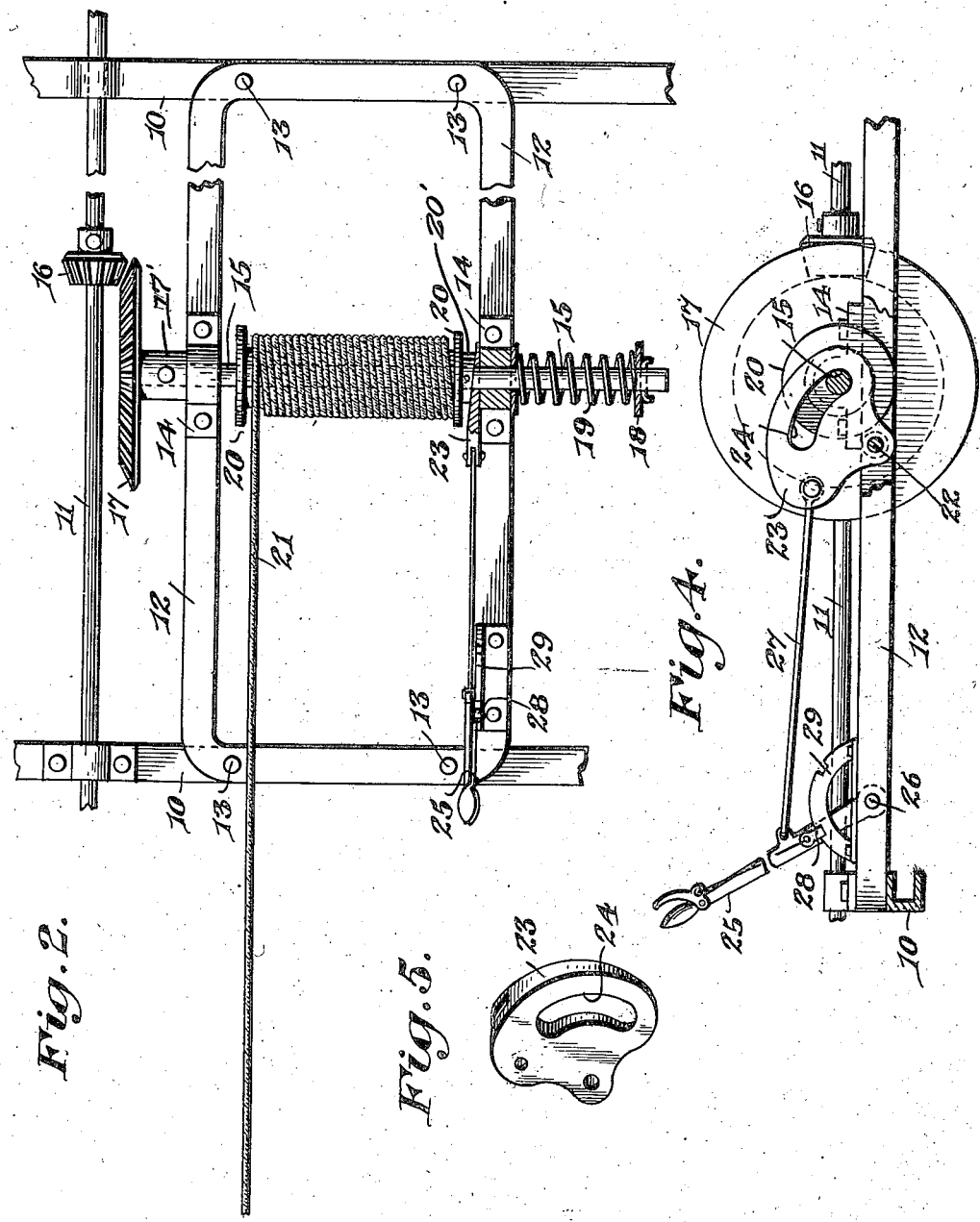
INVENTOR.
W. N. Clark
BY
Geo. F. Kimmel
ATTORNEY.

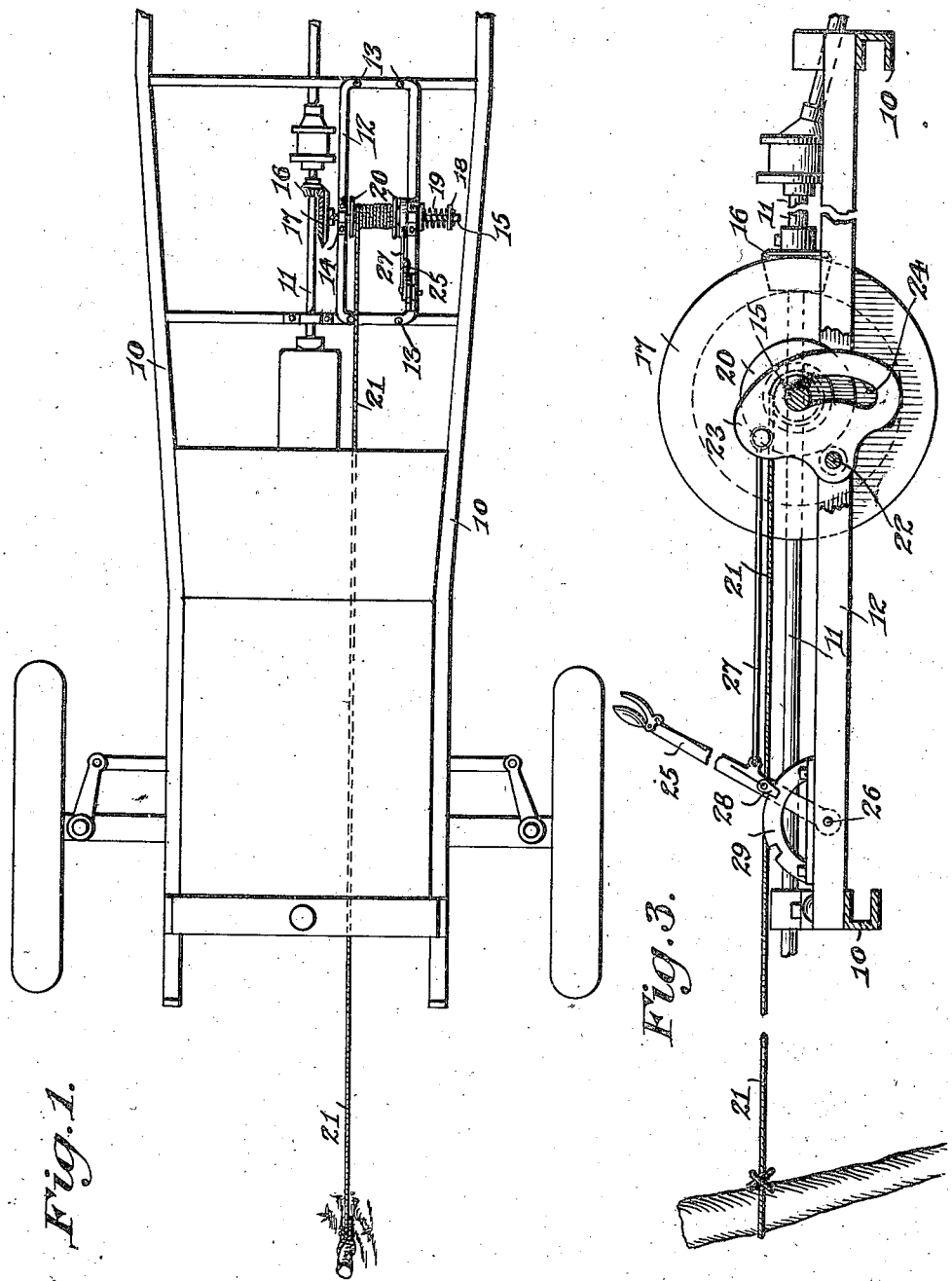

Patented Oct. 2, 1923.

1,469,249

UNITED STATES PATENT OFFICE.

WILLIAM NOBLE CLARK, OF FAYETTE, MISSOURI.

AUTOMOBILE EXTRACTOR.

Application filed January 14, 1922. Serial No. 529,263.

*To all whom it may concern:*

Be it known that I, WILLIAM NOBLE CLARK, a citizen of the United States, residing at Fayette, in the county of Howard and State of Missouri, have invented certain new and useful Improvements in Automobile Extractors, of which the following is a specification.

This invention relates to attachments for motor driven vehicles to enable the motor to be utilized to draw the vehicle over the ground independently of the traction wheels of the same.

Another object of the invention is to produce a device of this character which may be adapted without material structural change to motor driven vehicles of different forms and makes.

Another object of the invention is to provide a device of this character whereby the motor driven vehicle may be utilized to draw the vehicle from a position from which it could not be moved by the ordinary use of the motor.

With these and other objects in view the invention consists in certain novel features of construction as hereinafter shown and described and then specifically pointed out in the claims, and in the drawings illustrative of the preferred embodiment of the invention.

Figure 1 is a plan view of a portion of the frame work or chassis of a motor driven vehicle with the improvement applied.

Fig. 2 is an enlarged detail view of the improved device, partly in section.

Fig. 3 is a side elevation of the parts shown in Fig. 2 with the frame in section on the line 3—3 of Fig. 2 and with parts broken away to show the construction of certain parts, with the wedge shaped shipper member in open or inoperative position.

Fig. 4 is a view similar to Fig. 3 with the wedge shipper member in closed or operative position.

Fig. 5 is a detached perspective view of the wedge shaped shipper member.

The improved device may be readily adapted without material structural change to the chassis or frame work of motor driven vehicles of various forms and makes, but for the purpose of illustration is shown applied to a conventional frame work of a motor driven vehicle and represented conventionally at 10 and the main drive or transmission shaft at 11.

The improved attachment comprises a supporting frame 12, which will preferably be in one piece and oblong in outline and of sufficient length to be bolted or otherwise rigidly attached as shown at 13 to two or more of the transverse members of the chassis. Mounted upon the side members of the supporting frame are bearings 14 through which a shaft 15 is slidably supported.

Mounted for rotation with the shaft 11 is a bevel pinion 16, and mounted for rotation with the shaft 15 is a relatively large bevel gear 17 which is engaged by the pinion when the shaft 15 is in one position, as shown in Fig. 1, and disengaged therefrom when the shaft is disposed in another position as shown in Fig. 2. The gear 17 is provided with a hub 17', which is fixed to the shaft 15, and which constitutes a stop element, as the hub 17' is adapted to engage one side of the frame 12 due to the action of the spring 19, to be presently referred to.

The shaft 15 extends beyond the frame 12 at the end opposite to the gear 17, and is provided with a stop element 18 against which a spring 19 operates to hold the shaft 15 yieldably disposed at one end of its movement to hold the gear 17 normally disengaged from the pinion 16.

Mounted upon the shaft 15 between the sides of the frame 11 is a winding drum 20 to which a pull cable 21 is attached at one end and adapted to be extended forwardly or rearwardly of the vehicle as required.

The drum 20 is shorter than the distance between the sides of the frame 12, to permit the requisite longitudinal movement of the shaft 15. The drum 20, at one end, is provided with a bevelled collar 20'.

Pivoted at 22 to the adjacent side member of the frame 12 is a shipper member 23 and provided with a segmental slot 24 through which the shaft 15 extends, the curvature of the slot 24 being concentric to the pivot 22, so that the member 23 when turned on its pivot will not cramp on the shaft.

The member 23 is formed wedge shaped or with one face bevelled, or inclined with the thicker portion next to the pivot 22.

By this arrangement, when the member 23 is disposed with the slot 24 at one end of its path, as shown in Fig. 4, the thin portion of the "wedge" will be located between the collar 20' and the adjacent member of the frame 12 to enable the spring 18 to move the shaft 15 to one end of its movement and uncouple the gear 17 from the pinion 16, as shown in Fig. 2. Then when the member 23 is moved to the other end of its stroke until the other end of the slot 24 engages the shaft 15, as shown in Fig. 3, the thicker end of the "wedge" will be disposed between the collar 20' and the adjacent member of the frame 12 and move the shaft longitudinally against the resistance of the spring 19 and engage the gear 17 with the pinion 16, as shown in Fig. 1.

Any suitable means may be employed to operate the "wedge" member 23, but for the purpose of illustration, a pull lever 25 is shown pivoted at 26 to the adjacent member of the frame 12, and connected by a rod 27 to the member 23. The lever 26 is provided with a pawl device 28 coacting with a notched segment 29 to hold the member 23 in either open or closed position.

The improved attachment may be permanently located upon any convenient portion of the chassis, and when the vehicle is operating under normal conditions, the cable 21 will be fully wound upon the drum 20 with the "wedge" member withdrawn leaving the spring 19 free to hold the shaft 15 at the outer end of its movement and with the gear 17 disengaged from the pinion 16.

The presence of the improved device upon the vehicle does not interfere with its ordinary operations, or when running over ordinary relatively level roads. In event however of the wheels of the vehicle sinking into abnormal depression in the roadway, or when meeting abnormally steep grades upward which the motor cannot propel the vehicle, the cable 21 is drawn out and the free end attached to some stationary object, such as a tree, telephone or telegraph pole, or the like, and the lever 25 actuated to force the "wedge" member 23 into its operative position with its thicker part operating to force the shaft 15 longitudinally to engage the gear 17 with the pinion 16, so that the motion of the motor shaft 11 will be transmitted to the shaft 15 and wind the cable upon the drum and exert a strong pulling force to draw the vehicle into normal position.

The improved device is simple in construction, can be inexpensively manufactured, and applied without material structural change, as before stated, to motor driven vehicles of various forms and makes.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. In a device for the purpose set forth a frame, a spring controlled shaft arranged above and supported by said frame and further having its ends projecting outwardly from the frame, a drum fixed to said shaft and arranged within and normally spaced from said frame, a wedge shaped shifting element provided with a segmental slot through which passes said shaft, said element pivoted intermediate its ends to the inner face of one of the sides of the frame and permanently engaging said drum, and means connected to the upper end of said element for moving it upwardly and forwardly against the drum to shift the shaft against the action of its spring.

2. In a device for the purpose set forth a frame, a shaft slidably and rotatably mounted therein and projecting from each side thereof, stop elements at each end of said shaft, one of said elements cooperating with and normally engaging one side of the frame, a coiled spring arranged exteriorly of the frame and interposed between the other side thereof and the other stop element and further surrounding the shaft for normally maintaining the first mentioned stop element against the frame, a drum fixed to the shaft and arranged within and permanently spaced from the frame and having one end provided with a bevelled collar, a wedge shaped shifting element pivotally connected to one side of the frame and interposed between the latter and said collar, said shifting element having a segmental slot for the passage of said shaft, and means for pulling said shifting element forwardly on its pivot whereby said element will ride against said collar and shift said shaft transversely of the frame against the action of the spring.

3. In combination a rotatable and lengthwise shiftable spring controlled shaft provided with a fixed drum, a support for said shaft, a wedge shaped element positioned within and pivotally connected intermediate its ends to said support and further interposed between the support and the drum, said element provided with a segmental slot disposed lengthwise thereof and through which extends said shaft, and means connected to the upper end of said element for pulling it forwardly whereby the element will ride against the drum and shift the shaft against the action of its spring.

4. A device for the purpose set forth comprising a skeleton support, a shaft arranged on and projecting from each side of said support and having each end formed with a stop element, said shaft being lengthwise shiftable and one of said stop elements normally engaging with said support, a coiled spring mounted on said shaft exteriorly of said support and interposed between the other of said stop elements and the support for normally maintaining the first mentioned stop element against said support, a drum fixed to the shaft, a shifting element pivotally connected to the support and interposed between the drum and the support and provided with means for the passage of the shaft, and means for pulling said shifting element forwardly causing thereby the riding of the latter against the drum to shift the shaft against the action of its spring.

In testimony whereof, I affix my signature hereto.

WILLIAM NOBLE CLARK.